United States Patent

Bryant et al.

[15] 3,648,079

[45] Mar. 7, 1972

[54] HIGH-SPEED SENSE LATCH CIRCUIT

[72] Inventors: Richard W. Bryant, Poughkeepsie; George K. Tu, Wappingers Falls, both of N.Y.

[73] Assignee: Cogar Corporation, Wappingers Falls, N.Y.

[22] Filed: July 10, 1970

[21] Appl. No.: 53,780

[52] U.S. Cl. ............................307/289, 307/235, 330/30 D
[51] Int. Cl. ......................................H03k 5/20, H03k 3/286
[58] Field of Search ..................307/235, 289, 292; 330/30 D

[56] References Cited

UNITED STATES PATENTS

| | | | |
|---|---|---|---|
| 3,543,050 | 11/1970 | Paine | 307/235 |
| 3,444,472 | 5/1969 | Johnson | 330/30 X |
| 3,480,800 | 11/1969 | Lynes et al. | 307/235 X |
| 3,482,176 | 12/1969 | Yourke et al. | 330/30 |
| 3,548,206 | 12/1970 | Ogle et al. | 307/235 |

*Primary Examiner*—John Zazworsky
*Attorney*—Harry M. Weiss

[57] ABSTRACT

A sense latch circuit having a short access time. The latch output switches state rapidly due to the incorporation of a minimum number of logic stages between the sense inputs and the output drive stage, thereby introducing a minimum number of delays. Nonsaturable logic circuits are utilized to allow fast switching. At the inputs of the sense latch circuit, the high DC levels of the sense signals are reduced in magnitude for application to an ECL circuit switch with the use of diodes and resistor dividers. This arrangement allows for large temperature variations without saturating any of the logic stages.

12 Claims, 2 Drawing Figures

INVENTOR
RICHARD W. BRYANT
GEORGE K. TU
BY Amster & Rothstein
Harry M Weiss
ATTORNEYS

HIGH-SPEED SENSE LATCH CIRCUIT

This invention relates to sense latch circuits, and more particularly, to high-speed sense latch circuits.

A sense latch circuit for use with a plurality of memory cells serves to sense the state of a cell selected for reading and to set the state of a latch output in accordance with the state of the cell. Typically, a reset pulse first restores the latch output to the 0 state. The state of the cell is then sensed on a pair of sense lines and with the application of a set pulse the latch output is either left in the 0 state or switched to the 1 state in accordance with the state of the cell. With the termination of the set pulse, the output remains latched. A sense latch circuit is generally designed to allow fanout of the output signal, that is, the circuit is generally capable of driving a number of different circuits or circuits connected over relatively long lines.

One of the most important characteristics of a sense latch circuit is its access time. Each cycle generally begins with the application of a reset pulse. As soon as the set pulse is then applied, the output terminal of the circuit should switch to the desired state. Although the output becomes latched with the termination of the set pulse, the output is available immediately after the set pulse causes the state of the output to change. The shorter the access time, the faster the sensed information is available for processing.

It is a general object of our invention to provide a high-speed sense latch circuit.

This is achieved in the illustrative embodiment of the invention with the use of nonsaturable logic stages. Such stages permit rapid switching of the potential at the latch output terminal. At the inputs of the circuit, a combination of diodes and resistor dividers allow the relatively high DC level inputs to be reduced in magnitude for application to an ECL current switch without any of the logic stages becoming saturated with variations in temperature, a problem which has been exhibited with prior art sense latch circuits. Furthermore, the logic stages are organized such that a minimum number of individual delays are introduced between the sense inputs and the latch output. This organization of logic stages permits the latch output to switch states very rapidly, thereby reducing the access time to a value in the order of 20 nanoseconds.

Further objects, features and advantages of our invention will become apparent upon consideration of the following detailed description in conjunction wit the drawing, in which.

Figure 1:
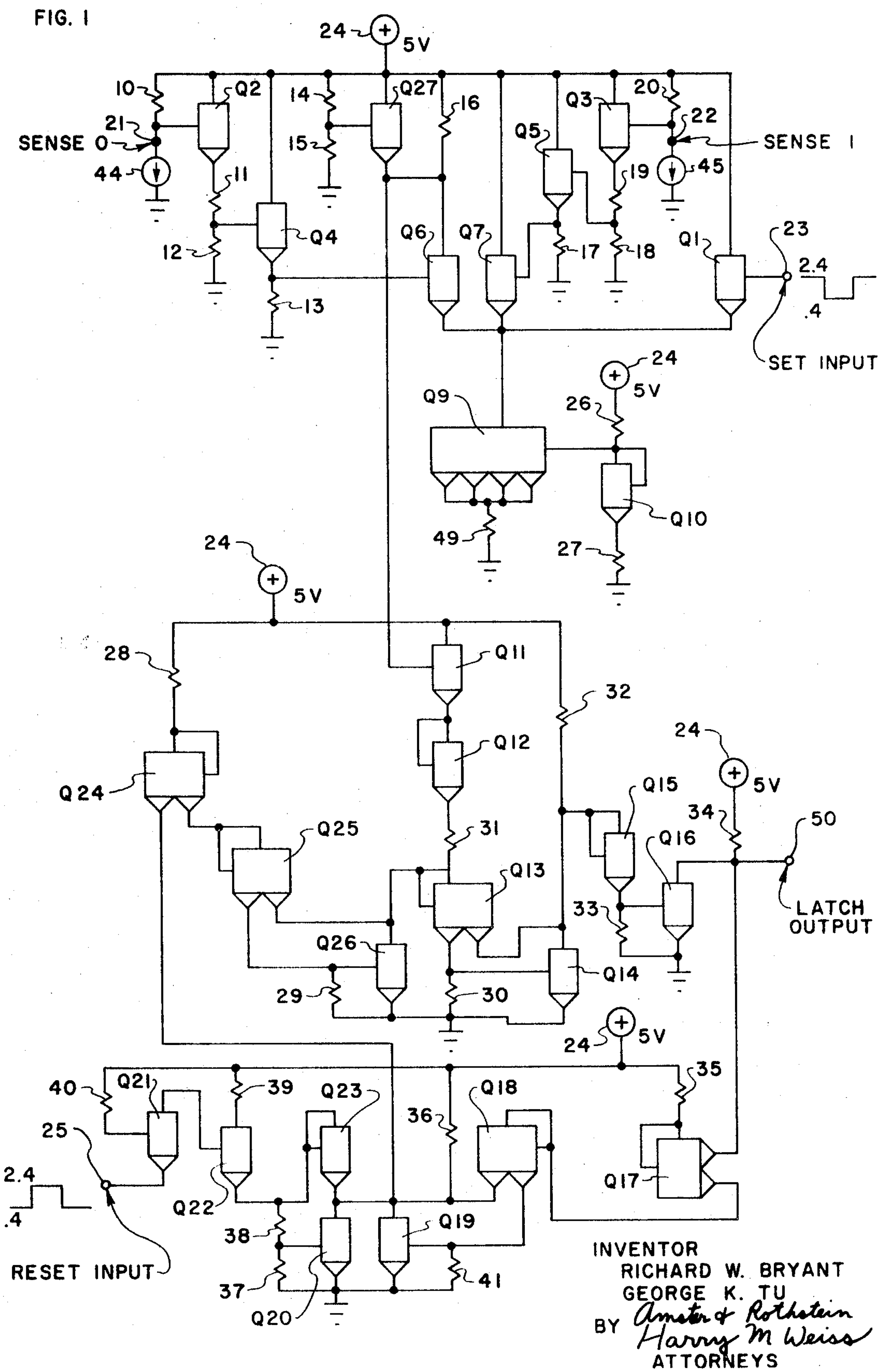
FIG. 1 depicts an illustrative embodiment of our invention.

The circuit of FIG. 1 is provided with five terminals. Sense signals appear on terminals 21, 22. When a cell is read, it causes current to flow from source 24 through one of resistors 10 or 20, and the respective one of the sense 0 or sense 1 terminals. Since the operation of a cell is not important for an understanding of the present invention, the connection of the sense latch circuit to a group of typical cells is not shown. Instead, two current sources 44 and 45 are shown simply to illustrate the direction of current flow when a cell is read. If the cell is in the 0 state current flows from terminal 21 in the direction indicated by current source 44, and if the cell is in the 1 current flows from terminal 22 in the direction indicated by current source 45.

A reset pulse is applied to reset input terminal 25 at the start of each cycle. This reset pulse causes the potential at the latch output terminal 50 to rise to the magnitude of source 44. A high potential at the latch output terminal represents a 0 while a low potential represents a 1. At the start of the cycle, the latch output is returned to the high level, the 0 state. Following the application of the reset pulse, a set pulse is applied to set input terminal 23. This pulse enables the latch output level to remain high in the event current flows through sense 0 terminal 21 and the latch output potential to go low in the event current flows through sense 1 terminal 22. The sensed output is available shortly after the leading edge of the set pulse, that is, shortly after the potential at terminal 23 drops from 2.4 volts to 0.4 volts. The output is actually latched (although it is available earlier) at the trailing edge of the set pulse and remains available until a reset pulse is applied to terminal 25 at the start of the next cycle.

Transistors Q6 and Q7 comprise an ECL current switch. Since the emitters of the two transistors are tied together only one of the transistors conducts (in the absence of the conduction of transistor Q1 as will be described below), depending upon which transistor has a greater base potential. If transistor Q7 conducts, transistor Q6 remains nonconducting and the potential at its collector rises to the potential of source 24. In the event transistor Q6 conducts, current from source 24 flowing through resistor 16 and the transistor causes the potential at the collector of the transistor to go low. Transistor Q27 is provided in order to prevent the saturation of transistor Q6 when it conducts. Resistors 14 and 15 comprise a voltage divider and maintain a constant potential at the base of transistor Q27. When transistor Q27 conducts, its emitter potential is 0.8 volt lower than the potential of the junction of the resistors. (It is assumed that the base-emitter drop of a conducting transistor in the circuit of FIG. 1 is 0.8 volt.) Consequently, the potential at the collector of transistor Q6 cannot fall below a minimum value determined by the relative magnitudes of resistors 14 and 15. By preventing the potential at the collector of transistor Q6 from going too low, transistor Q6 cannot saturate. It is the signal at the collector of transistor Q6 which reflects whether a 0 or 1 state has been sensed in the cell selected for reading.

The emitter of transistor Q1 is coupled to the emitters of transistors Q6 and Q7. With set input terminal 23 at a high potential, neither of transistors Q6 an Q7 conducts because the base potential of transistor Q1 is greater than the base potentials of transistors Q6 and Q7 even if one of current sources 44 or 45 operates.

Transistor Q9 provides a constant current for either of transistors Q1, Q6, or Q7. If transistor Q1 conducts, as it does before the set input pulse is generated, all of the current from transistor Q9 goes through transistor Q1 and both of transistors Q6 and Q7 remain off. In such a case, the collector of transistor Q6 is at a high potential. It is only when the set input pulse goes low that no current flows through transistor Q1. It is at this time that current flows through one of transistors Q6 and Q7 depending on the state of the selected cell.

Transistor Q9, in combination with transistor Q10, forms a current source for use with transistors Q1, Q6 and Q7. Transistor Q10 functions as a diode, current flowing from source 24 through resistor 26, the diode and resistor 27 to ground. The collector (base) of transistor Q10 is coupled to the base of four-emitter transistor Q9. Since transistors Q9 and Q10 are included on the same chip, they have very nearly identical characteristics. Thus the base of transistor Q9 is held at the same potential as the base of transistor Q10. To insure equal emitter potentials, and thus equal current flow through transistor Q10 and each of the four emitter terminals of transistor Q9, resistor 27 has a magnitude four times the magnitude of resistor 49. Transistor Q10 with its associated resistors determines the current which flows through transistor Q9. Were transistor Q9 to have only a single emitter, the current through transistor Q10 would have to be four times as great to control an equal current to flow through transistor Q9. The use of a four-emitter transistor, together with a resistor 49 whose magnitude is only one-quarter that of the magnitude of resistor 27, requires only one-fourth of the current which would otherwise have to flow through transistor Q10 and thus conserves power.

It would be possible to utilize a resistor connected between the common connection of the emitters of transistors Q1, Q6 and Q7, and ground. However, the use of a resistor, as has been done in some prior art circuits, results in current variations dependent on the conducting common-emitter transistors Q1, Q6, Q7 and possible instability of the circuit. The use of a constant current source transistor Q9 prevents such current variations. The collector of transistor Q9 is at a relatively low potential in order that transistors Q6 and Q7 be capable of being driven by relatively low DC level base signals. This permits large swings at the collector of transistor Q6. Although the potential at the collector of transistor Q9 is low, it is not low enough to cause saturation of transistor Q9 which would allow current variations through the transistor. Typically, the collector of transistor Q9 is at a potential of 0.8 volt, 4 milliamperes flow through the transistor and resistor 49 has a magnitude of 50 ohms. Consequently, the emitters of transistor Q9 are at a potential of 0.2 volt, the collector-emitter drop of the transistor is 0.6 volt, and the transistor is not saturated.

In the event current source 45 operates (if the sensed cell is in the 1 state), current flows from source 24 through resistor 20, terminal 22 and the current source. The base of transistor Q3 drops in potential and a reduced current flows through resistors 18 and 19. Consequently, the emitter of transistor Q5 and hence the base of transistor Q7 is at a lower potential than the base of transistor Q6; thus transistor Q7 remains off. At the same time, since current source 45 is operated current source 44 is not operated. The potential of source 24 is coupled through resistor 10 to the base of transistor Q2 and this transistor conducts. Current flows through resistors 11 and 12 to forward bias the base of transistor Q4. This transistor conducts and the positive potential developed across resistor 13 is applied to the base terminal of transistor Q6. This potential is less than 2.4 volts, the potential applied to set input terminal 23 during quiescent conditions. When transistor Q1 conducts, transistor Q6 cannot conduct even if its base potential is high. However, as soon as the set pulse is applied to the base of transistor Q1 and this transistor turns off, the high potential at the base of transistor Q6 causes this transistor to conduct. Current flows through resistor 16 and transistor Q6, and the collector of the transistor goes low. The collector potential is clamped by transistor Q27 as described above in order that transistor Q6 does not saturate. A low-level signal at the collector of transistor Q6 represents a 1 state being sensed from the cell.

Similarly, if current source 44 operates rather than current source 45, transistor Q7 conducts rather than transistor Q6. In this case, the collector of transistor Q6 is at the 5-volt level of source 24 and represents a 0. It should be noted that a high-level signal appears at the collector of transistor Q6 at all times during each cycle except during the application of the set pulse. The collector of the transistor goes low only during the application of the set pulse, and then only if the state of the sensed cell is a 1.

The potential at each of terminals 21 and 22 is 5 volts in the absence of the flow of current through the terminals. Such high potentials are generally required on the sense lines which couple a group of monolithic memory cells to the two differential inputs of a sense latch circuit. The signal swing at either terminal when one of the current sources operates is typically only 0.3 volt.

It is desirable to provide for a large swing at the collector of transistor Q6. In the illustrative embodiment of the invention, the collector potential of transistor Q6 swings between 2 and 5 volts. For such a large swing, it is only necessary to provide swings at the base terminals of transistors Q6 and Q7 in the order of 0.1 volt, both signals being at relatively low DC levels. In the illustrative embodiment of the invention, the signal at the base of each of transistors Q6 and Q7 swings between 1.85 and 2 volts. It is thus necessary to translate the DC level at each of terminals 21 and 22 to a lower level at the base terminal of the respective one of transistors Q6 and Q7.

In the prior art, this has generally been accomplished with the use of a series of diodes each of which reduces the DC level but allows the full signal swing to be transmitted through it. However, the drop across a typical diode decreases by approximately 2 millivolts per degree Centigrade increase in temperature. If four such diodes are used to translate the signal at each input terminal to a signal suitable for application to the base terminal of one of transistors Q6 and Q7, there is an 8-millivolt decrease in potential for each one-degree increase in temperature, and there is a 0.8 volt rise in the DC level at the base of each of transistors Q6 and Q7 for a 100° rise in temperature. The large DC levels at the base terminals of transistors Q6 and Q7 can result in saturation of the transistors and therefore reduce speed of operation.

The necessary voltage translation is accomplished in the illustrative embodiment of the invention with the use of a pair of diodes (transistors Q2, Q4 and Q3, Q5) and a resistor voltage divider (resistors 11, 12 and 18, 19) associated with each input terminal. Since only two base-emitter junctions are connected between each of terminals 21 and 22, and the base terminal of the respective one of transistors Q6 and Q7, there is only a 4-millivolt drop in DC level for each 1° rise in temperature. The additional translation of the DC level results from the inclusion of a voltage divider in each input circuit. It is apparent, for example, that the DC level at the base of transistor Q4 is less than the DC level at the emitter of transistor Q2 by the ratio of the magnitude of resistor 11 to the sum of the magnitudes of resistors 11 and 12. Although the voltage divider also reduces the signal swing at the base of transistor Q6, there is sufficient signal swing left to control the proper switching of transistors Q6 and Q7.

As will become apparent below, the circuit is designed such that with a high potential at the collector of transistor Q6, latch output terminal 50 is high. If a 0 has been sensed in the selected cell, the set pulse causes the collector of transistor Q6 to remain high. The collector remains high even after the termination of the set pulse and the latch output similarly remains high. It is only when a 1 state is sensed and the collector of transistor Q6 goes low to cause the latch output to go low that some means must be provided to keep the output latched to the low level even after the set pulse terminates and the collector of transistor Q6 goes high. A feedback circuit is provided for this purpose as will be described below. This feedback circuit functions to control conduction in transistor Q26 when the latch output first goes low with the conduction of transistor Q6. Once transistor Q26 conducts, it remains conducting even after the collector of transistor Q6 goes high; conduction in transistor Q26 thereafter keeps the latch output low. At the start of each cycle, the latch output is reset to the 0 state (high level) in the event the feedback circuit was functioning during the previous cycle to keep the latch output low. The reset circuitry will be described below. However, the reset function, shown in FIG. 2 in both of two successive cycles, should be noted as occurring at the start of each cycle.

Figure 2:
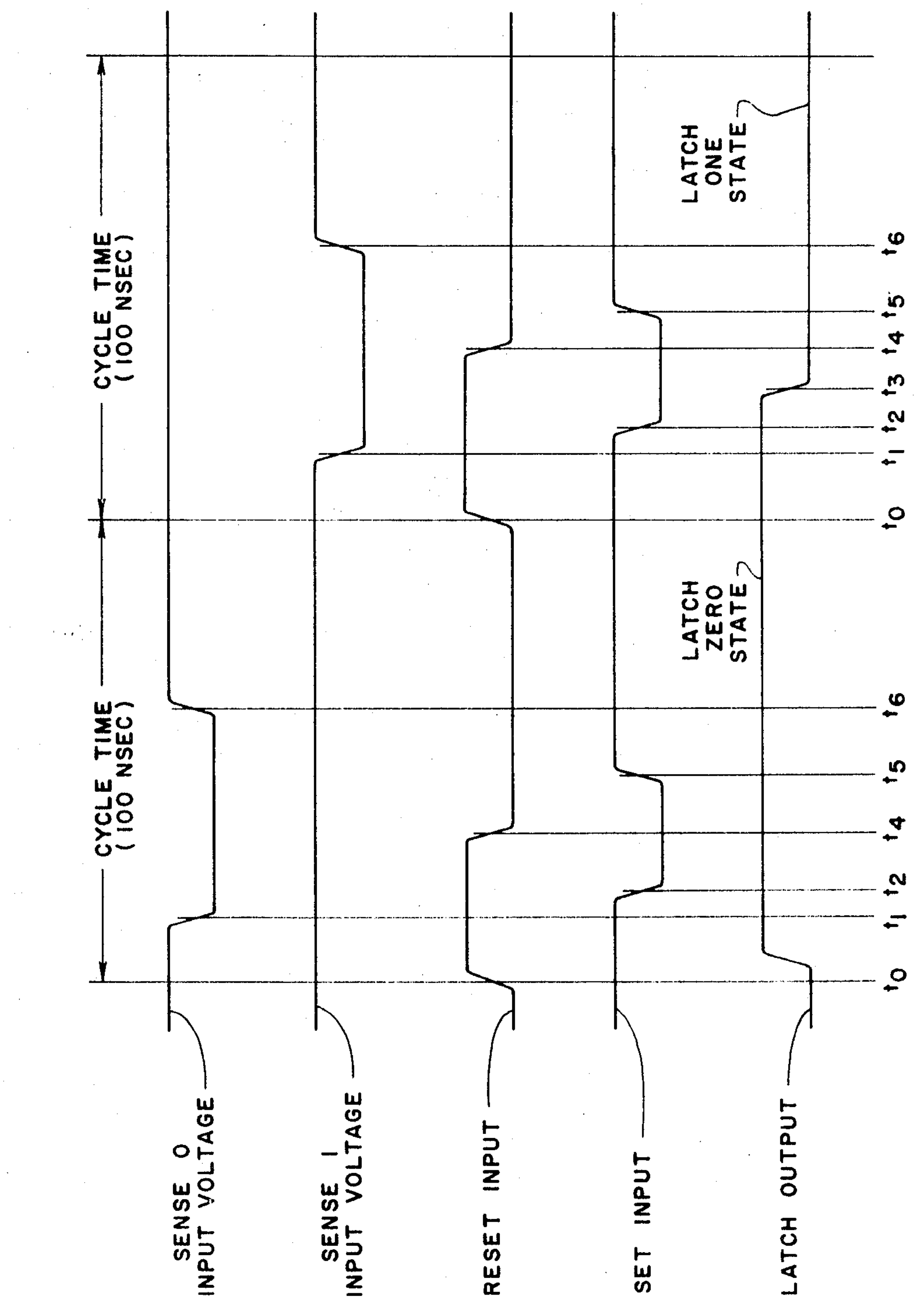
FIG. 2 is a timing diagram which will be helpful in understanding the operation of the circuit of FIG. 1.

During the first cycle a negative input voltage is shown occurring at the sense 0 input terminal, while during the second cycle a negative signal is shown occurring at the sense 1 input terminal. In both cases, the reset input goes high at the start of each cycle, before the input signal is generated. No matter what the state of the latch output terminal 50, with the application of the reset pulse the terminal goes high. FIG. 2 shows the latch output initially low, thereby indicating that a 1 was represented at terminal 50 during the previous cycle (not shown). At time $t_0$, the reset input goes high and shortly thereafter the latch output goes high as well. In the case of the second cycle shown on FIG. 2, at the start of the cycle the latch output is already high. Therefore, with the generation of the reset pulse there is no change in the state of the latch output at time $t_0$ during the second cycle.

The reset pulse causes transistor Q26 to turn off in the event the transistor was previously conducting to maintain a low-level output at terminal 50. This operation will be described below. The latching of the output terminal in either state will now be considered, assuming that the reset pulse has been generated and transistor Q26 has turned off in the event it was previously conducting.

Suppose the cell being read is in the 0 state. With the application of the set pulse to terminal 23, the potential at the collector of transistor Q6 does not change; it remains high. The collector of transistor Q6 is coupled to the base of transistor Q11. This transistor conducts as does transistor Q12. The latter transistor has its collector and base terminals interconnected and thus functions as a diode. With a 0.8-volt drop across the base-emitter junction of transistor Q11 and the same drop across transistor Q12, the emitter of transistor Q12 is at 3.4 volts. Current flows through the leftmost emitter of transistor Q13 and through resistor 30 to ground. The positive potential at the base of transistor Q14 causes this transistor to conduct, current flowing from source 24 through resistor 32 and the transistor. The collector of transistor Q14 is returned through the rightmost emitter of transistor Q13 to resistor 31. The potential at the base of transistor Q14 when it turns on is 0.8 volt since the base-emitter drop across the transistor is 0.8 volt. The base is returned through one diode to resistor 31 and the collector of transistor Q14 is returned through an identical diode to the same resistor. Since the drops across the two diodes are equal, the collector of transistor Q14 is held at the same potential as the base of the transistor, 0.8 volt. This insures that transistor Q14 does not saturate as it would if the collector potential went too low.

In order for transistors Q15 and Q16 to conduct, it is necessary for a 0.8-volt potential to appear across each of the base-emitter junctions. Since a total of 1.6 volts is required for conduction of the two transistors, and the collector potential of transistor Q14 is only 0.8 volt, both of transistors Q15 and Q16 remain nonconducting. No current flows through transistor Q16 and its collector, connected to latch output terminal 50, is at the potential of source 24—+5 volts. This high potential represents a 0.

Referring to FIG. 2 it will be seen that the sense 0 input voltage goes low at time $t_1$ and is immediately followed by the set pulse at time $t_2$. Although the going low of the set input causes the collector of transistor Q16 to be high, the collector of the transistor was previously high since it went high with the application of the reset pulse to terminal 25. Consequently, the sense 0 input signal has no effect on the potential at the latch output terminal. When the reset input pulse terminates, it has no effect on the latch output as will become apparent below. Similarly, when the set input goes high there is no change in the latch output because the collector of transistor Q6 remains high.

With a 5-volt potential appearing at terminal 50, the uppermost diode of transistor Q17 remains off. Current flows from source 24 through resistor 35, the lowermost diode of transistor Q17, and the base-emitter junction of transistor Q18 and resistor 41 to ground. Transistor Q19 thus turns on, current flowing from source 24 through resistor 36 and the transistor to ground. The base of transistor Q19 is at 0.8 volt. In the event the collector of transistor Q19 attempts to fall below this potential, the leftmost diode of transistor Q18 conducts; since the two diodes of transistor Q18 are identical, their emitter potentials cannot differ if they both conduct current and the collector of transistor Q19 cannot drop in potential below 0.8 volt. Transistor Q18 serves as a clamp to prevent saturation of transistor Q19 when it conducts just as transistor Q13 serves to prevent saturation of transistor Q14 when it conducts.

The low potential at the collector of transistor Q19 is extended to the leftmost emitter of transistor Q24. Current flows from source 24 through resistor 28, the leftmost diode of transistor Q24 and transistor Q19 to ground. A potential of 0.8 volt thus appears at the leftmost emitter of transistor Q24. Were the rightmost emitter to conduct, the potential at this emitter would similarly be 0.8 volt since the drops across the two diodes of transistor Q24 are necessarily equal when they both conduct. This potential is insufficient for forward biasing both transistors Q25 and Q26 since a total potential of 1.6 volts is required for this purpose. Consequently, the rightmost diode of transistor Q24 does not conduct enough to forward bias transistor Q26 and Q26 remains off. When transistor Q26 is off, it has no effect on transistors Q12 and Q13; the current flowing through transistors Q11, Q12 and Q13, both during the application of the set pulse (when a 0 state is sensed) and after the set pulse terminates is unaffected. Transistor Q14 remains on and the latch output remains high.

In effect, when the latch output is high (a 0) the feedback circuit is inoperative because transistor Q26 remains nonconducting. The feedback circuit is required only to latch a low-level signal at the latch output terminal.

As shown on FIG. 2, at the start of a second cycle (when the reset input goes high at time $t_0$) the latch output remains high (a 0) since it is already in that state at the end of the first cycle. Thereafter, the sense 1 input signal appears but has no effect on the circuit since the set input is still high. At time $t_2$ the set input goes low. Transistor Q6 conducts and its collector potential drops to 2 volts, the collector potential being clamped by transistor Q27. A 2-volt potential across the base-emitter junction of transistor Q11, transistor Q12, resistor 31, transistor Q13 and resistor 30 is insufficient for causing current to flow through all of these elements. Consequently, transistor Q13 does not conduct heavily enough to forward bias the base-emitter junction of transistor Q14. The collector potential of the transistor is at the 5-volt level of source 24, and current flows through transistor Q15 and resistor 33 to ground. Transistor Q16 turns on and current flows from source 24 through resistor 34 and the transistor. The latch output now goes low to represent a 1. Because transistor Q14 when it previously conducted was not saturated, as a result of the use of clamping transistor Q13 which clamps the collector voltage of transistor Q14 to 0.8 volt, the transistor is capable of turning off rapidly. This allows the latch output to go low very quickly. Transistor Q16, when it conducts, is saturated because of standard logic level interface requirements. The collector of the transistor is at less than 0.2 volt.

With a low potential extended to the upper emitter of transistor Q17, current flows from source 24 through resistor 35 and the upper diode of the transistor. For current to flow through transistor Q19 the lowermost emitter of the lowermost diode must be at a potential of 1.6 volts to develop a 0.8-volt potential across the base-emitter junction of each of transistors Q18 and Q19. Since both emitters of transistor Q17 must be at the same potential if they conduct, transistor Q19 remains off.

In order to understand the feedback operation, it is necessary at this point to consider the operation of the reset circuit. As long as reset terminal 25 is low in potential, current flows from source 24 through resistor 40 and the base-emitter junction of transistor Q21. Transistor Q22 remains off and neither of transistors Q23 and Q20 conduct. With transistor Q20 off, it has no effect on the circuit operation. The junction of the collectors of transistors Q19 and Q20 is at a high or at a low level depending on the conduction of transistor Q19.

However, when the reset input goes high, the base-emitter junction of transistor Q21 is reverse biased. At this time current flows through the base-collector junction of the transistor and transistor Q22 is forward biased. Current flows from source 24 through resistor 39, transistor Q22, and resistors 38 and 37 to ground. The potential developed across resistor 37 forward biases the base-emitter junction of transistor Q20. Transistor Q23 simply serves to clamp the voltage at the collector of transistor Q20 to the potential at the junction of the emitter of transistor Q22 and resistor 38. Since 0.8 volt appear across resistor 37, the potential at the emitter of transistor Q22 is determined by the relative magnitudes of resistors 37 and 38. The collector of transistor Q20 is necessarily 0.8 volt less than the potential at the junction of the emitter of transistor Q22 and resistor 38. Resistors 37 and 38 are selected such that when transistor Q20 conducts its collector potential does not fall below 0.4 volt. This prevents saturation of transistor Q20 and permits its rapid turnoff when the reset pulse terminates.

As long as the reset pulse appears at terminal 25, transistor Q20 conducts. The effect of the conduction of transistor Q20 is the same as the effect of the conduction of transistor Q19 when the latch output is high—transistor Q26 remains off. Were transistor Q26 to remain off, the latch output would be low only while the collector of transistor Q6 is low. As soon as the collector of the transistor goes high with the termination of the set pulse, the current through transistors Q11 and Q12 would once again flow through transistor Q13 and the latch output would go high. What the feedback circuit does is to turn on transistor Q26 so that at the end of the set pulse, when current flows through transistors Q11 and Q12, the current is diverted through transistor Q26 to ground and does not flow through transistor Q13. Transistor Q13 thus remains off and the latch output remains low. But in order for transistor Q26 to turn on, transistor Q20 must first turn off, and since the latch function (the conduction of transistor Q26) must be performed before the set pulse and the sense 1 signal terminate, the reset pulse must terminate while the collector of transistor Q6 is still low. This is shown in FIG. 2; the reset input pulse terminates at time $t_4$, at which time the sense voltage is still present and the set input is still low.

As soon as the reset pulse terminates, transistor Q20 turns off. At this time, since the latch output is low and transistor Q19 is off, the potential at the leftmost emitter of transistor Q24 rises to the potential of source 24. Current now flows from source 24 through resistor 28 and the rightmost diode of transistor Q24. This current flows through the leftmost diode of transistor Q25 and resistor 29 to ground. Transistor Q26 turns on. Transistor Q25 functions as a clamp just as do transistors Q13 and Q18—the collector potential of transistor Q26 when it conducts is kept equal to the base potential (0.8 volts) in order that the transistor does not saturate. With transistor Q26 conducting, when the set pulse terminates at time $t_5$ (see FIG. 2) the collector of transistor Q6 goes high and the current which flows through transistors Q11 and Q12 now flows through transistor Q26 rather than transistor Q13. The bypass provided by transistor Q26 insures that transistor Q14 remains off. Transistors Q15 and Q16 conduct so that the latch output remains low.

It is now apparent why the reset pulse functions to return the latch output to a high level in the event it was previously low. The reset pulse causes transistor Q20 to conduct and the potential at the leftmost emitter of transistor Q24 to go low. No current flows through transistor Q25 and transistor Q26 is off. Thus the current which flows through transistors Q11 and Q12 does not flow through transistor Q26 at the start of each cycle as soon as the reset pulse is generated. Instead, it flows through transistor Q13 and Q14 and causes the latch output to go high.

As shown on FIG. 2, the reset pulse terminates before both the set pulse and the sense input terminate. Were this not the case, transistor Q20 would remain conducting until after the collector of transistor Q6 went high once again. With transistor Q26 off, the current which would now flow through transistor Q13 would cause the latch output to go high and transistor Q19 to turn on. This in turn would keep transistor Q26 off even after the reset pulse terminated. It is for this reason that the reset pulse terminates at a time $t_4$ when the collector of transistor Q6 is still low in the event the 1 sense signal is present at terminal 22.

There are some other timing relationships which are of importance. As shown on FIG. 2, the reset input goes high before the set input goes low. Were the set input low with the generation of the reset pulse, and were there noise at the sense 1 terminal, the collector of transistor Q6 would be low. Transistor Q14 would not conduct and the latch output would go low even if it was previously high. Also, as shown in FIG. 2, the set pulse terminates before the signal voltage terminates. The latch output can be switched only with the application of a set pulse. Were the signal to terminate before the set pulse, noise at either terminal 21 or 22 could place the latch output in the improper state, that is, the noise would be treated as a true input signal. By maintaining a sense signal at one of the two input terminals until after the set pulse terminates, the circuit cannot be set erroneously.

With reference to FIG. 2, it is apparent that the latch output goes high immediately after the reset pulse is applied at time $t_0$. The access time is determined by that time when it is certain that the latch output is not to go low (to represent a 1) in the event that a 1 has been sensed. This time is $t_3$ as shown in the second cycle on FIG. 2. (Time $t_3$ is not shown for the first cycle inasmuch as no change takes place in the latch output when the set input goes low since the sense 0 terminal is energized.) Time $t_3$ occurs approximately 20 nanoseconds after time $t_0$ in the illustrative embodiment of the invention.

The short access time is attributable to a number of factors, including the use of nonsaturated logic stages. (Even if the temperature of the circuit increases significantly, the input stage of the circuit does not saturate to increase the access time because of the combined diode and resistor voltage divider networks used for DC level translation, as described above.) The access time is also reduced significantly due to the overall organization of the logic stages in such a way that there is a minimum number of delays between the two sense inputs and the latch output due to transistor switching delays. Basically, the system can be thought of as comprising two individual circuits. The first circuit consists of all those elements which cause current to flow through transistors Q11 and Q12, that is, those elements which develop a high or a low potential at the collector of transistor Q6. This circuit provides a high-level signal at the base of transistor Q11 when the set input is high, or when the set input is low and the sense 0 terminal goes low, and the circuit provides a low-level signal at the base of transistor Q11 when the set signal goes low together with the sense 1 signal. The second circuit provides a high output at latch output terminal 50 when the base of transistor Q11 is high and provides a low output when the base of transistor Q11 is low. This circuit also feeds back a low-level output in order that the current through transistors Q11 and Q12 be diverted through transistor Q26 after the base of transistor Q11 goes high at the end of the set input pulse. The reset input in effect interrupts the feedback circuit so that transistor Q26 turns off at the start of each cycle so that the current through transistors Q11 and Q12 is no longer bypassed around transistors Q13 and Q14 and the latch output is thus made to go high.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What we claim is:

1. A high-speed sense latch circuit comprising a pair of sense input terminals, a set input terminal, a reset input terminal, a latch output terminal, a current switch having two input terminals and an output terminal, semiconductor voltage dropping means and resistor voltage divider network means connected between each of the sense input terminals and a respective one of said current switch input terminals for translating the DC voltage level at each of said sense input terminals to a reduced voltage level at each of said current switch input terminals, means for controlling a first signal at said current switch output terminal responsive to both the application of a set pulse to said set input terminal together with the application of a first sense signal to said sense input terminals and the absence of the application of a set pulse to said set input terminal, and for controlling a second signal at said current switch output terminal responsive to the application of a set pulse to said set input terminal together with the application of a second sense signal to said sense input terminals, means for generating a current responsive to the appearance of said first signal at said current switch output terminal, means for conducting said current when generated and responsive to said current for causing a first potential to appear at said latch output terminal and responsive to the absence of said current for causing a second potential to appear at said latch output terminal, feedback means responsive to said second potential appearing at said latch output terminal for bypassing subsequently generated current from said conducting means to maintain said latch output terminal at said second potential even when said first signal is thereafter developed at said current switch output terminal, and means responsive to the application of a reset pulse to said reset input terminal for turning off said feedback bypassing means.

2. A high-speed sense latch circuit in accordance with Claim 1 wherein said conducting means and said feedback bypassing means each includes at least one semiconductor logic stage and means for preventing saturation upon conduction thereof.

3. A high-speed sense latch circuit in accordance with claim 2 wherein said first potential at said latch output terminal is high relative to said second potential and said feedback bypassing means includes first transistor means for generating a low-level signal responsive to said first potential appearing at said latch output terminal, second transistor means for generating a low-level signal responsive to the application of a reset pulse to said reset input terminal, and means coupled to said conducting means for diverting current therefrom responsive to the generation of a low-level signal by either of said first and second transistor means.

4. A high-speed sense latch monolithic integrated circuit comprising a pair of sense input terminals, a set input terminal, a reset input terminal, a latch output terminal, a current switch having two input terminals and an output terminal, means for controlling a first signal at said current switch output terminal responsive to both the application of a set pulse to said set input terminal together with the application of a first sense signal to said sense input terminals and the absence of the application of a set pulse to said set input terminal, and for controlling a second signal at said current switch output terminal responsive to the application of a set pulse to said set input terminal together with the application of a second sense signal to said sense input terminals, means responsive to the appearance of said first signal at said current switch output terminal for causing a first potential to appear at said latch output terminal and responsive to the appearance of said second signal at said current switch output terminal for causing a second potential to appear at said latch output terminal, feedback means responsive to said second potential appearing at said latch output terminal for maintaining said latch output terminal at said second potential even when said first signal is thereafter developed at said current switch output terminal, and means responsive to the application of a reset pulse to said reset input terminal for turning off said feedback means, said potential-causing means and said feedback means each including at least one semiconductor logic stage and means for preventing saturation upon conduction thereof.

5. A high-speed sense latch circuit in accordance with claim 4 wherein said first potential at said latch output terminal is high relative to said second potential and said feedback means includes first transistor means for generating a low-level signal responsive to said first potential appearing at said latch output terminal, second transistor means for generating a low-level signal responsive to the application of a reset pulse to said reset input terminal, and means responsive to the generation of a low-level signal by either of said first and second transistor means for enabling said first potential to appear at said latch output terminal.

6. A high-speed sense latch circuit in accordance with claim 5 further including resistor divider means and semiconductor voltage-dropping means connected between each of the sense input terminals and a respective one of said current switch input terminals for translating the DC voltage at each of said sense input terminals to a different DC voltage at the respective one of said current switch input terminals.

7 A high-speed sense latch circuit in accordance with claim 4 further including resistor divider means and semiconductor voltage-dropping means connected between each of the sense input terminals and a respective one of said current switch input terminals for translating the DC voltage at each of said sense input terminals to a different DC voltage at the respective one of said current switch input terminals.

8. A high-speed sense latch circuit comprising a pair of sense input terminals, a set input terminal, a reset input terminal, a latch output terminal, switching means having two input terminals and an output terminal, means for controlling a first signal at said switching means output terminal responsive to both the application of a set pulse to said set input terminal together with the application of a first sense signal to said sense input terminals and the absence of the application of a set pulse to said set input terminal, and for controlling a second signal at said switching means output terminal responsive to the application of a set pulse to said set input terminal together with the application of a second sense signal to said sense input terminals, means responsive to the appearance of said first signal at said switching means output terminal for causing a first potential to appear at said latch output terminal and responsive to the appearance of said second signal at said switching means output terminal for causing a second potential to appear at said latch output terminal, feedback means responsive to said second potential appearing at said latch output terminal for maintaining said latch output terminal at said second potential even when said first signal is thereafter developed at said switching means output terminal, and means responsive to the application of a reset pulse to said reset input terminal for turning off said feedback means, said potential causing means and said feedback means each including at least one semiconductor logic stage and means for preventing saturation upon conduction thereof.

9. A high-speed sense latch circuit in accordance with claim 8 wherein said first potential at said latch output terminal is high relative to said second potential and said feedback means includes first transistor means for generating a low-level signal responsive to said first potential appearing at said latch output terminal, second transistor means for generating a low-level signal responsive to the application of a reset pulse to said reset input terminal, and means responsive to the generation of a low-level signal by either of said first and second transistor means for enabling said first potential to appear at said latch output terminal.

10. A high-speed sense latch circuit in accordance with claim 9 further including resistor divider means and semiconductor voltage-dropping means connected between each of the sense input terminals and a respective one of said switching means input terminals for translating the DC voltage at each of said sense input terminals to a different DC voltage at the respective one of said switching means input terminals.

11. A high-speed sense latch circuit in accordance with claim 8 further including resistor divider means and semiconductor voltage-dropping means connected between each of the sense input terminals and a respective one of said switching means input terminals for translating the DC voltage at each of said sense input terminals to a different DC voltage at the respective one of said switching means input terminals.

12. A high-speed latch circuit comprising a pair of sense input terminals, a set input terminal, a reset input terminal, a latch output terminal switching means having two input terminals and an output terminal, means for controlling a first signal at said switching means output terminals responsive to both the application of a set pulse to said set input terminal together with the application of a first sense signal to said sense input terminals and the absence of the application of a set pulse to said set input terminal, controlling and for controlling a second signal at said switching means output terminal responsive to the application of a set pulse to said set input terminal together with the application of a second sense signal to said sense input terminals, means responsive to the appearance of said first signal at said switching means output terminal for causing a first potential to appear at said latch output terminal and responsive to the appearance of said second signal at said switching means output terminal for causing a second potential to appear at said latch output terminal, feedback means responsive to said second potential appearing at said latch output terminal for maintaining said latch output terminal at said second potential even when said first signal is thereafter developed at said switching means output terminal, and means responsive to the application of a reset pulse to said reset input terminal for turning off said feedback means, resistor divider means and semiconductor voltage-dropping means connected between each of the sense input terminals and a respective one of said switching means input terminals for translating the DC voltage at each of said sense input terminals to a different DC voltage at the respective one of said switching means input terminals.

* * * * *